United States Patent
George

[11] Patent Number: 6,020,420
[45] Date of Patent: Feb. 1, 2000

[54] WATER-DISPERSIBLE POLYESTERS

[75] Inventor: Scott Ellery George, Kingsport, Tenn.

[73] Assignee: Eastman Chemical Company, Kingsport, Tenn.

[21] Appl. No.: 09/266,084

[22] Filed: Mar. 10, 1999

[51] Int. Cl.$^7$ .............................. C08J 81/00; C08G 63/02
[52] U.S. Cl. ........................ 524/609; 528/272; 528/295; 528/298; 528/300; 528/301; 528/302; 528/306; 528/307; 528/308; 528/308.6; 524/601; 524/604; 524/605; 524/612
[58] Field of Search ...................................... 528/272, 295, 528/298, 300, 301, 302, 306, 307, 308, 308.6, 361; 524/601, 604, 605, 609, 612

[56] References Cited

U.S. PATENT DOCUMENTS

| | | |
|---|---|---|
| 2,976,266 | 3/1961 | Lytton et al. . |
| 3,018,272 | 1/1962 | Griffing et al. . |
| 3,033,822 | 5/1962 | Kibler et al. . |
| 3,075,952 | 1/1963 | Coover et al. . |
| 3,734,874 | 5/1973 | Kibler et al. . |
| 3,779,993 | 12/1973 | Kibler et al. . |
| 3,842,040 | 10/1974 | Browne et al. . |
| 3,842,041 | 10/1974 | Browne et al. . |
| 4,233,196 | 11/1980 | Sublett . |
| 4,304,901 | 12/1981 | O'Neill et al. . |
| 4,483,976 | 11/1984 | Yamamoto et al. . |
| 4,699,845 | 10/1987 | Oikawa et al. . |
| 4,940,744 | 7/1990 | Tortorici et al. . |
| 5,011,877 | 4/1991 | Morris et al. . |
| 5,037,947 | 8/1991 | Morris et al. . |
| 5,075,364 | 12/1991 | Phan et al. . |
| 5,274,025 | 12/1993 | Stockl et al. . |
| 5,290,631 | 3/1994 | Fleury et al. . |
| 5,344,872 | 9/1994 | Debord et al. . |
| 5,543,488 | 8/1996 | Miller et al. . |
| 5,543,489 | 8/1996 | Alex et al. . |
| 5,750,605 | 5/1998 | Blumenthal et al. . |

*Primary Examiner*—Samuel A. Acquah
*Attorney, Agent, or Firm*—Bernard J. Graves, Jr.; Harry J. Gwinnell

[57] ABSTRACT

This invention provides crystalline, water-dispersible polyesters comprising residues of 4,4'-biphenyl dicarboxylic acid. The polyesters comprise residues of 4,4'-biphenyl dicarboxylic acid, at least one difunctional sulfomonomer in an amount sufficient to provide water dispersibility to the polyester, and a glycol or a mixture of glycols. The polyesters of the invention are useful in ink and adhesive compositions.

14 Claims, No Drawings

WATER-DISPERSIBLE POLYESTERS

FIELD OF THE INVENTION

This invention relates to the field of polyester chemistry. In particular, it relates to certain sulfopolyesters having copolymerized therein residues of 4,4'-biphenyl dicarboxylic acid.

BACKGROUND OF THE INVENTION

Both legislative and marketplace developments are pushing for reduced volatile organic emissions in a variety of industries. In an increasing number of industries, aqueous coating compositions continue to replace solvent-based compositions in efforts to reduce volatile organic emissions. A variety of paints, inks, sealants, and adhesives which were previously formulated with organic solvents are now formulated as aqueous compositions. However, conventional resins used for these compositions are mostly hydrophobic, and thus it is difficult to disperse them with water or otherwise make such resins compatible with water. Further, it is generally known that crystalline polyesters are not dispersible in or compatible with water.

U.S. Pat. No. 2,976,266 describes film-forming copolyesters based on combinations of 4,4'-biphenyl dicarboxylic acid (BDA) with linear and branched aliphatic glycols. U.S. Pat. Nos. 3,842,040 and 3,842,041 describe manufacturing processes where poly(ethylene-4,4'-biphenyl dicarboxylate) may be prepared from ethylene oxide or ethylene glycol and BDA. A number of patents describe copolyesters comprised of BDA and their blends with a large group of property modifiers. (See, for example, U.S. Pat. Nos. 5,011,877 and 5,037,947). These references describe narrow compositional ranges for copolyesters of BDA with various combinations of cycloaliphatic and aliphatic glycols, none of which provided water-dispersible polyesters. In fact, excellent solvent resistance is cited in a number of the examples. Water is specifically identified as having no effect on molded bars after 24 hours in U.S. Pat. Nos. 5,011,877 and 5,037,947.

Linear, water-dispersible polyesters and polyesteramides, based on the incorporation of sulfonate groups were first reported in U.S. Pat. Nos. 3,734,874 and 3,779,993. These references taught a number of dicarboxylic acids as potential components of these polyesters, and included diphenic acid:

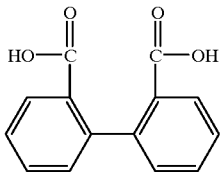

However, neither reference taught the use of BDA.

Further examples of water-dispersible sulfopolyester compositions can be found in U.S. Pat. Nos. 5,290,631 and 4,233,196.

U.S. Pat. No. 4,483,976 describes various polyester binder fibers and lists dicarboxylic acid components that include both biphenyl dicarboxylic acid and diphenic acid; however, the 4,4' isomer is not specifically disclosed. Further, the specification teaches only compositions containing from about 5–20 mole % of a low to medium molecular weight poly(ethylene glycol). U.S. Pat. No. 4,699,845 teaches certain adhesive polyester films and lists biphenyl dicarboxylic acid without specifying viability of a particular isomer, although specific isomers of phthalic and naphthalene dicarboxylic acid are indicated for this end use. Further, the invention is limited to compositions containing at least 60 mole % on an aromatic dicarboxylic acid and less than 60 mole % of diethylene or triethylene glycol. Also noted was a dispersion concentration of 1–8% by weight.

None of the cited references describe copolyesters containing residues of 4,4'-biphenyl dicarboxylic acid which have excellent water-dispersibility. There is also no mention in the above references of compositions having substantial amounts of crystallinity and the concomitant benefits thereof. It is generally known in the art that crystalline polyesters tend to possess excellent water-resistance; thus, it is surprising that the polymers of the present invention, as described below, retain the desired properties of water-dispersibility as well as possessing substantial amounts of crystallinity.

SUMMARY OF THE INVENTION

This invention, as described below, illustrates that 4,4'-biphenyl dicarboxylic acid (BDA) can be incorporated into sulfopolyester resins to provide crystalline polyester compositions which retain unusually high water-dispersibility. Thus, the present invention provides crystalline, water-dispersible polyester resins comprising the reaction product, i.e., residues, of 4,4'-biphenyldicarboxylic acid, at least one difunctional sulfomonomer in an amount sufficient to provide water-dispersibility to the resulting polyester, and a glycol or a mixture of glycols. The difunctional sulfomonomer contains at least one sulfonate group bonded to an aromatic ring substituted with ester, hydroxyl, or carboxylic acid functional groups. Optionally, at least one other difunctional dicarboxylic acid which is other than a 4,4'-biphenyl dicarboxylic acid is included in the reaction.

DETAILED DESCRIPTION OF THE INVENTION

Described herein are certain copolyester compositions and methods of preparation of such compositions. The copolyesters of the invention are essentially linear, water-dispersible polyesters which contain residues of 4,4'diphenyl dicarboxylic acid, optionally substituted by 1–4 methyl groups, and certain sulfomonomers. The term "water-dispersible" is often used interchangeably with other descriptors such as "water-dissipatable", "water-soluble", or "water-dispellable". In the context of this invention, all of these terms refer to the activity of water or a mixture of water and a water-miscible cosolvent on the polyesters described herein. Examples of such water-miscible cosolvents includes alcohols, ketones, glycol ethers, esters and the like, typically used in waterborne coating compositions. It is intended for this terminology to include conditions where the polyester is dissolved to form a true solution as well as those where the polyester is dispersed within the aqueous medium to obtain a stable product. Often, due to the statistical nature of polyester compositions, it is possible to have a soluble fraction and a dispersed fraction when a single polyester sample is placed in an aqueous medium.

The polyesters of the present invention contain substantially equal molar proportions of acid equivalents (100 mol %) and hydroxyl equivalents (100 mol %) such that the total of acid and hydroxyl equivalents is equal to 200 mol % and have a melt temperature ($T_m$) of at least about 80° C. In this regard, the polyesters of the present invention are also essentially linear. By "essentially linear" it is meant that while linear polyesters are preferred, small amounts of branching agents may be utilized, in an amount less than that which would render the resulting polyester amorphous. For example, branching agents such as trimethylolpropane, trimethylolethane, trimellitic acid, etc., can be used in an amount of about 0–10 mol %, preferably in an amount of about 0–5 mol %.

Thus, the present invention provides an essentially linear water-dispersible copolyester composition comprising residues of:

(a) 4,4'diphenyl dicarboxylic acid, optionally substituted by 1–4 methyl groups;

(b) optionally, at least one difunctional dicarboxylic acid which is other than a sulfomonomer;

(c) an amount of at least one difunctional sulfomonomer containing at least one metal sulfonate group bonded to an aromatic ring, wherein the functional group is selected from esters, hydroxyl, or carboxyl;

(d) optionally, at least one hydroxycarboxylic acid; and (e) a diol or mixture of diols, wherein the diol(s) comprises a poly(ethylene) glycol present in an amount of at least about 60 mol % based on the total hydroxyl equivalents;

wherein the polymer contains substantially equal molar proportions of acid equivalents (100 mole %) and diol equivalents (100 mole %), and wherein the inherent viscosity of said copolyester is at least about 0.1 dL/g measured in a 60/40 parts by weight solution of phenol/tetrachloroethane solvent at 25° C. and at a concentration of about 0.25 g of copolyester in 100 mL of solvent, and wherein the copolyester has a melt temperature ($T_m$) of at least about 75° C. and a glass transition temperature ($T_g$) of less than about 125° C.

The minimum level of water-dispersibility of the crystalline water-dispersible copolyesters of the present invention is that required to form an aqueous dispersion of at least 10% (w/w) of the crystalline water-dispersible polyester in water. Thus, the amount of component (c) above, is that which renders the polyester with sufficient dispersibility to meet this criteria. Preferably, the water-dispersible copolyesters of the present invention are dispersible in a 30% (w/w) aqueous medium. The water-dispersible polyesters described herein have an inherent viscosity of at least about 0.1 dL/g, preferably about 0.2 to 0.3 dL/g, and most preferably greater than about 0.3 dL/g, measured in a 60/40 parts by weight solution of phenol/tetrachloroethane solvent at 25° C. and at a concentration of about 0.25 g of copolyester in 100 mL of solvent.

The 4,4'-biphenyl dicarboxylate monomer, optionally containing one to four methyl substituents, may be used in the form of the free acid or as the lower alkyl ester thereof; it is preferred that the dimethyl ester be used.

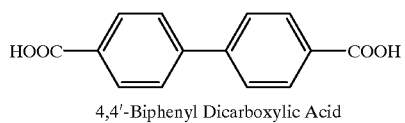

4,4'-Biphenyl Dicarboxylic Acid

Examples of suitable dicarboxylic acid comonomers that may be used as component (b) include aliphatic diacids, alicyclic dicarboxylic acids, aromatic dicarboxylic acids, or mixtures of two or more of these acids. Although not limiting, suitable dicarboxylic acids include succinic; glutaric; adipic; azelaic; sebacic; fumaric; maleic; itaconic; 1,3-cyclohexane dicarboxlic; 1,4-cyclohexanedicarboxylic; diglycolic; 2,5-norbornanedicarboxylic; phthalic; terephthalic; 1,4-naphthalenedicarboxylic; 2,5-naphthalenedicarboxylic; 2,6-naphthalenedicarboxylic; 2,7-naphthalenedicarboxylic; diphenic; 4,4'-oxydibenzoic; 4,4'-sulfonyldibenzoic; and isophthalic. Preferred diacids include isophthalic and terephthalic acids. As a branching agent, polyacids such as trimellitic anhydride, pyromellitic dianhydride, and 1,3,5 -benzenetricarboxylic acid. In this context, it should be understood that the use of the corresponding anhydrides, esters, and acid chlorides of such diacids could be similarly utilized. Further, when referring to "residues" of such compounds, it should be understood that the residue is the repeat unit which remains after the polycondensation reaction to form the corresponding polyester. As starting materials, the diesters are the most preferred form. In this regard, the most preferred diacid residue starting materials include dimethyl terephthalate, dimethyl isophthalate, and dimethyl-1,4-cyclohexanedicarboxylate. Although the methyl esters are preferred, the reactions could also be carried out using higher alkyl esters such as ethyl, propyl, butyl, etc. In addition, aromatic esters such as phenyl, could also be used. The diacid comonomer may constitute from 1 to 100 mole % of the total acid component. At high levels of diacid comonomer, the 4,4'-biphenyl dicarboxylate moiety may be viewed as a minor component whose presence tends to raise the glass transition temperature ($T_g$) of the water-dispersible copolyester. At low levels of diacid comonomer it is possible, for example, to adjust the crystalline melting point or level of crystallinity of a given copolyester that is mainly comprised of 4,4'-biphenyl dicarboxylic acid residues. In this fashion, a variety of low, intermediate, or high levels of diacid comonomer modifications can be made to alter the physical properties of the water-dispersible copolyesters of the present invention.

The difunctional sulfomonomer component (c) may be a dicarboxylic acid or ester thereof containing a metal sulfonate group (—$SO_3M$) or a glycol containing a metal sulfonate group or a hydroxy acid containing a metal sulfonate group. The cation of the sulfonate salt may be a metal ion such as $Li^+$, $Na^+$, $K^+$, $Mg^{++}$, $Ca^{++}$, $Ni^{++}$, $Fe^{++}$, $Fe^{+++}$, and the like. Alternatively, the sulfonate salt may be non-metallic and may be a nitrogenous base as described in U.S. Pat. No. 4,304,901, incorporated herein by reference. A nitrogen based cation will be derived from nitrogen-containing bases, which may be aliphatic, cycloaliphatic, or aromatic compounds that have ionization constants in water at 25° C. of $10^{-5}$ to $10^{-8}$. Examples of such nitrogen containing bases include ammonia, pyridine, morpholine, and piperidine.

It is known that the choice of cation will influence the water-dispersibility of the resulting polymer. Monovalent alkali metal ions yield polyesters that are less readily dissipated by cold water and more readily dissipated by hot water, while divalent and trivalent metal ions typically result in polyesters that are not dissipated by cold water, but may be to some degree in hot water. Depending on the end-use application of the polymer, either of the different sets of properties may be desirable.

It is possible to prepare the polyester using, for example, a sodium sulfonate salt and then by ion-exchange methods replace the sodium with a different ion, such as zinc, when the polymer is in the dispersed form. This type of ion exchange procedure is generally superior to preparing the polymer with divalent and trivalent salts insofar as the sodium salts are usually more soluble in the polymer reactant melt-phase. (See, for example, U.S. Pat. Nos. 4,304,901 and 4,940,744, incorporated herein by reference.) Also, the ion-exchange procedure is usually necessary to obtain the nitrogenous counterions, since the amine salts tend to be unstable at typical melt processing conditions. Advantageous difunctional sulfomonomers are those where the sulfonate salt group is attached to an aromatic acid nucleus, such as benzene, naphthalene, diphenyl, oxydiphenyl, sulfonyldiphenyl, or methylenediphenyl. Preferably, sulfophthalic acid, sulfoterephthalic acid, sulfoisophthalic acid, 4-sulfonaphthalene-2,7-dicarboxylic acid, and their esters are utilized, as described in U.S. Pat. No. 3,779,993, incorporated herein by reference. Particularly preferred is 5-sodiosulfoisophthalic acid, or esters thereof, as shown below:

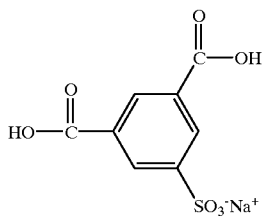

It is preferred that reactant (c) be present in an amount of about 5 to 40 mole percent, more preferably about 8 to 30 mole percent, and most preferably about 11 to 25 mole percent, based on the total acid equivalents.

Optionally, 0 to about 50 mole percent, based on total carboxyl and hydroxyl equivalents, of component (d), a hydroxycarboxylic acid, may be utilized. These hydroxycarboxylic acids include aromatic, cycloaliphatic, or aliphatic and generally contain 2–20 carbon atoms, one —$CH_2OH$ group and one —COOH or —COOR group, wherein R is a $C_1$–$C_6$ alkyl group.

The glycol component (e), includes aliphatic, alicyclic, and aralkyl glycols. Examples of such glycols include ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; and p-xylylenediol. In addition, poly(ethylene glycols) of low, medium and high molecular weights are particularly suitable and often preferred, since they impart a secondary measure of hydrophilicity to the resulting polymer. Preferred examples of low molecular weight poly(ethylene glycols) include; diethylene glycol, triethylene glycol, and tetraethylene glycol, with diethylene glycol, triethylene glycol being preferred. Examples of medium and relatively high molecular weight poly(ethylene glycols) of component (e) include the commercially available materials sold by Union Carbide under the mark CARBOWAX®. These medium to relatively high molecular weight poly(ethylene glycols) normally have molecular weights ranging from about 300 to 20,000, with 500 to 2000 being preferred. As branching agents, monomers such as trimethylol propane, trimethylol ethane, pentaerythritol, and glycerol could be utilized.

The molecular weight and the mole percent of poly (ethylene glycol) are inversely proportional to each other. In other words, as molecular weight is increased, the mole percent of poly(ethylene glycol) will be decreased. As an illustration, diethylene and triethylene glycols may constitute up to 100 mole percent of the total glycol, while a poly(ethylene glycol) having a molecular weight of 10,000 would typically be used at a level of less than one mole percent of total glycol.

Further, certain glycols may be formed in situ, due to side reactions that may be controlled by varying the process conditions. One preferred example of this is the formation of varying proportions of diethylene, triethylene, and tetraethylene glycols from ethylene glycol due to an acid-catalyzed dehydration, which occurs readily when a buffer is not added to raise (i.e., less acidic) the pH of the reaction mixture. (See U.S. Pat. No. 5,290,631, incorporated herein by reference.)

To obtain the polymers of this invention, the difunctional sulfomonomer is preferably added directly to the reaction mixture from which the polymer is made. Other processes which can be utilized include those methods taught in U.S. Pat. Nos. 3,018,272; 3,075,952; and 3,033,822; incorporated herein by reference. These references disclose interchange reactions as well as polymerization of build-up processes. Preferably, the crystalline water-dispersible polyesters according to this invention are prepared in a two-stage process, comprising an esterification (or ester-interchange) step and a polycondensation step. The ester-interchange or esterification step is preferably conducted under an inert atmosphere at a temperature of 150° to 250° C. for 0.5 to 8 hours, more preferably from 180° to 230° C. for 1 to 4 hours. The glycols, depending on their reactivities and the specific experimental conditions employed, are preferably used in molar excesses of 1.05 to 2.5 per total moles of acid-functional monomers. The second stage, referred to as polycondensation, is preferably conducted under reduced pressure at a temperature of 230° to 350° C., more preferably 240° to 300° C., and most preferably 250° to 285° C. for 0.1 to 6 hours, preferably 0.25 to 2 hours. Stirring or appropriate conditions are used in both stages to ensure adequate heat transfer and surface renewal of the reaction mixture. The reactions of both stages are facilitated by appropriate catalysts known in the art and taught, for example, in U.S. Pat. Nos. 3,018,272; 3,075,952; and 3,033,822, incorporated herein by reference. Suitable catalysts include alkoxy titanium compounds, alkali metal hydroxides and alcoholates, salts of organic carboxylic acids, alkyl tin compounds and metal oxides. For example, the catalysts may be selected from titanium (IV) isopropoxide, zinc (II) acetate, tetrabutyl titanate (IV), manganese (II) acetate, dibutyl tin (IV) dilaurate, stannous (II) octoate, antimony (III) oxide, and germanium (IV) dioxide.

A number of compositions within this invention contain substantial amounts of crystallinity. The presence of crystallinity along with the property of water-dispersibility is a desirable feature, insofar as cast films made from such polymers may possess enhanced resistance to heat. (See, for example, U.S. Pat. Nos. 5,750,605 and 5,543,489, incorporated herein by reference.)

In this regard, the typical $T_g$ value for a polyester is less than 125° C.; thus, at temperatures above 125° C., a film will soften and tend to block or stick to other films or substrates. A specific example can be found in the textile area where a coating or size is applied to a yarn to protect it during the weaving operation. The sized yarn is wound onto a spool (called a beam) for use in the weaving process. If the protective size blocks (i.e., sticks to itself), it will not be possible to unwind the yarn. This problem is particularly pronounced in hot and humid areas. On the other hand, water-dispersible sulfopolyesters generally have relatively low (i.e., <20,000) molecular weights, which do not result in outstanding physical property profiles. For example, sulfopolyesters having $T_g$'s above room temperatures tend to be brittle materials. Lowering the $T_g$ to less than room temperature will result in a flexible film, but the film will again be prone to blocking. A melting point ($T_m$) provides another thermal transition that not only occurs at a higher temperature than $T_g$, but also may allow a material to have a low $T_g$ for flexibility combined with a high $T_m$ for blocking resistance. If flexibility is not a concern, a $T_m$ can still greatly increase the heat resistance range of a sulfopolyester. Example 1 below has a $T_g$ of 52° C. and a $T_m$ of 181° C., thus the blocking temperature of this sulfopolyester is well over 100° C. If it did not have a relatively high $T_m$ it would only be useful to temperatures around 50° C.

Typically, the detection of substantial amounts of crystallinity may be most readily accomplished by the observation of a melting point. Differential scanning calorimetry (DSC) is generally acceptable as a method of choice for determining melting transitions (Tm) of polymeric materials. Wide angle X-ray scattering (WAXS) is an excellent confirmation technique to determine the degree of crystallinity. Particularly good results are obtained when the polymer exhibits a Tm of at least 75° C. in combination with a low Tg, preferably less than 50° C. Preferably, in a crystalline water-dispersible copolyester of the invention, the $T_m$ ranges from about 75° to about 225° C., more preferably 80° to 185° C., and the $T_g$ ranges from about −10° to about 125° C., more preferably from 30° to 60° C.

Sulfopolyesters containing greater than 60 mole % of polyethylene glycols such as diethylene glycol (DEG), triethylene glycols (TEG) or tetraethylene glycols, possess excellent water-dispersibility and tough films may be obtained from compositions containing predominant amounts of TEG. Incorporation of greater than 40 mole % of glycols without internal ether moieties will either result in neglible levels of crystallinity or loss of water-dispersibility. It is acceptable to incorporate acid comonomers at levels up to 25 mole %, based on total acid, and retain at least some crystalline character within the polymer. Those skilled in the art will recognize that the structure of said co-acid will influence the ultimate level of crystallinity and water-dispersibility. Linear, straight-chain co-acids, such as terephthalic acid and 1,4-cyclohexanedicarboxylic acid will have a more beneficial effect on crystallinity than non-linear residues such as isophthalate and 1,3-cyclohexanedicarboxylate. It is also to be recognized that when both a difunctional acid, other than a 4,4'-biphenyl dicarboxylic or a sulfomonomer, and a diol other than TEG or DEG are present in combination, the best results are achieved when the sum total of "acid" and "diol" is not greater than 40 mole % (based on 200 mole % total) depending on the particular "acid" or "diol" combination. Thus, one aspect of the water-dispersible copolyesters of this invention comprises an essentially linear, semi-crystalline, water dispersible copolyester composition prepared from the reaction products of:

(a) 4,4'-biphenyl dicarboxylic acid (b) from 0 to about 25 mol %, based on the total acid equivalents, of at least one difunctional dicarboxylic acid which is other than a sulfomonomer or a 4,4'diphenyl dicarboxylic acid;

(c) from about 10 to about 30 mol %, based on the total acid equivalents, of at least one difunctional sulfomonomer containing one metal sulfonate group bonded to an aromatic ring substituted with ester, hydroxyl, or carboxylic acid functional groups;

(d) greater than 60 mole % of diethylene or triethylene glycol; and (e) optionally, less than 40 mol %, based on the total hydroxyl equivalents, of a glycol without internal ether moieties, wherein the polyester contains substantially equal molar proportions of acid equivalents (100 mol %) and glycol equivalents (100 mol %), wherein the inherent viscosity of said copolyester is at least about 0.1 dL/g measured in a 60/40 parts by weight solution of phenol/tetra-chloroethane solvent at 25° C. and at a concentration of about 0.25 g of copolyester in 100 mL of solvent, and wherein the copolyester has a melt temperature ($T_m$) of about 80° C. to 185° and a glass transition temperature ($T_g$) of about 30° to 60° C.

Also provided are the above copolyesters dispersed in water, preferably as an aqueous dispersion comprising at least 10% (w/w) of the copolyesters of this invention in water.

As noted above, the water-dispersible polyesters of the present invention can be utilized as binder resins in inks, textile sizes, in cosmetic and personal care formulations, coatings, as polymer additives and as adhesives. With regard to adhesive formulations, see U.S. Pat. No. 5,543,488, incorporated herein by reference.

In the case of ink formulations, U.S. Pat. Nos. 5,344,872; 5,274,025; and 5,075,364; incorporated herein by reference, provide methods for preparing ink formulations, the various ingredients, including pigments, boicides, defoamers, etc.

Experimental Section

Examples 1–6 are representative of crystalline compositions, while Example 7 is a comparative Example to illustrate that some compositions outside the scope of this invention may be crystalline, but are not water-dispersible. Example 8 shows that some compositions may be water-dispersible but not crystalline.

EXAMPLE 1

Preparation of Water-Dispersible Polyester Containing 21 Mole % of 5-Sodiosulfoisophthalate and Diethylene Glycol A 500 mL round bottom flask equipped with a ground-glass head, agitator shaft, nitrogen inlet, and a sidearm to allow for removal of volatile materials was charged with 110.7 grams (0.41 mol) of dimethyl4,4'-biphenyl dicarboxylate (BDA), 26.6 grams (0.09 mol) dimethyl-5-sodiosulfoisophthalate, 106.0 grams (1.00 mol) diethylene glycol, 0.51 mL of a 1.46% (w/v) solution of titanium isopropoxide in n-butanol, and 0.74 grams (0.009 mol) sodium acetate. The flask was purged with nitrogen and immersed in a Belmont metal bath at 200° C. for 60 minutes and 230° C. for an additional 90 minutes under a slow nitrogen sweep with sufficient agitation. After elevating the temperature to 280° C. in a vacuum, ≦0.5 mm was attained and held for 62 minutes to perform the polycondensation. The vacuum was then displaced with a nitrogen atmosphere and the polymer was allowed to cool before removal from the flask. An inherent viscosity of 0.33 dL/g was determined for the recovered polymer according to ASTM D2857-95. A glass transition temperature (Tg) of 52° C. and a melting point (Tm) of 181° C. were obtained for the crystalline polymer from thermal analysis by DSC. The polymer was dispersed in 90°–95° C. water in 90 minutes to form a slightly viscous, milky white dispersion. The product, analyzed to be 10% solids, remained stable after 24 hours storage in ambient conditions.

EXAMPLE 2

Preparation of Water-Dispersible Polyester Containing 17 Mole % 5-Sodiosulfoisophthalate and Triethylene Glycol The apparatus and general procedure described in Example 1 were used with the exception that the polycondensation time was changed. The amounts initially charged to the flask are: 110.7 grams(0.41 mol) BDA, 26.6 grams (0.09 mol) dimethyl-5-sodiosulfoisophthalate, 150 grams (1.00 mol) triethylene glycol, 0.74 grams (0.009 mol) sodium acetate, and 0.76 mL of a 1.46% (w/v) solution of titanium (IV) isopropoxide in n-butanol. The polycondensation was carried out at 280° C. and at a pressure of 0.2 mm Hg for 34 minutes. A crystalline polymer was recovered that had an inherent viscosity of 0.47 (ASTM D3835-79) and the Tg and Tm values, measured by DSC, were 34° C. and 83° C., respectively. The actual percentage of crystallinity was determined by wide-angle X-ray diffraction to be 37%. A 30% (w/w) dispersion was readily obtained by stirring the polymer in 80°–85° C. deionized water for 60 minutes. The dispersed product possessed a hazy, translucent appearance and was storage stable after 3 months at room temperature.

Examples 3 through 8 employ the procedures employed above. The key parameters and results are summarized in Table 1 below.

TABLE 1

Water-dispersible polyesters based on 4,4'-biphenyl dicarboxylate modification

| Example Number | Acid Composition[1] (Mole %) | Glycol Composition (Mole %) | SIP Content (Mole %) | IV | $T_g$ (°C.) | $T_m$ (°C.) |
|---|---|---|---|---|---|---|
| 3 | BDA (80) | DEG (38) TEG (62) | 19 | 0.34 | 32 | 113 |
| 4 | BDA (82) | EG (39) DEG (61) | 18 | 0.32 | 60 | 170 |
| 5 | BDA (73) T (10) | DEG (100) | 17 | 0.35 | 58 | 150 |
| 6 | BDA (75) I (8) | DEG (100) | 16 | 0.46 | 56 | 156 |
| 7 | BDA (84) | DEG (54) CHDM (46) | 18 | 0.36 | 105 | 214 |
| 8 | CDA (49) BDA (33) | TEG (100) | 18 | 0.40 | 4 | none |

[1]mole % acid composition + mole % SIP content = 100
Key to abbreviations:
EG = ethylene glycol
DEG = diethylene glycol
TEG = triethylene glycol
CHDM = 1,4-cyclohexanedimethanol
CDA = 1,4-cyclohexanedicarboxylate
BDA = 4,4'biphenyl dicarboxylate
T = Terephthalate
I = Isophthalate
SIP = 5-sodiosulfoisophthalate

EXAMPLES 3 AND 4

Variation of Glycol Components to Achieve High Melting Points with the Retention of Water-Dispersibility These examples illustrate how various combinations of EG, DEG, and TEG yield crystalline sulfopolyesters that are water dispersible. Both samples were easily dispersed on a stirrer/hotplate in less than 30 minutes at 90° C. or less to yield white, "emulsion-like" dispersions at ≧10 % (w/w) solids in deionized water.

EXAMPLES 5 AND 6

Effect of Low-Level Acid Modification

These Examples show that replacing less than 25 mole % of the BDA with a co-acid generally results in compositions containing substantial amounts of crystallinity. In these examples, terephthalate and isophthalate units were incorporated and crystalline polymers resulted. Both samples were dispersible at ≧10 % (w/w) solids in deionized water after stirring for 90 minutes at 90° C.

EXAMPLE 7 (Comparative)

Non-Dispersible Crystalline Composition

This crystalline composition contains less than the required minimum of 60 mol % of a polyethylene glycol, in this case, diethylene glycol and did not form a stable dispersion in deionized water after stirring for 2 hours at 85°–90° C.

EXAMPLE 8

Effect of Higher Levels of Acid Modification

At co-acid levels >25 mole % non-crystalline compositions may be obtained that exhibit excellent water-dispersibility; the sample was dispersed at 15% (w/w) solids in less than 30 minutes at 80° C. to produce a clear, slightly amber product.

I claim:

1. An essentially linear water-dispersible copolyester composition comprising residues of:
    (a) 4,4'diphenyl dicarboxylic acid, optionally substituted by 1–4 methyl groups;
    (b) optionally, at least one difunctional dicarboxylic acid which is other than a sulfomonomer;
    (c) an amount of at least one difunctional sulfomonomer containing at least one metal sulfonate group bonded to an aromatic ring, wherein the functional group is selected from esters, hydroxyl, or carboxyl;
    (d) optionally, at least one hydroxycarboxylic acid; and
    (e) a diol or mixture of diols, wherein the diol(s) comprises a poly(ethylene) glycol present in an amount of at least about 60 mol % based on the total hydroxyl equivalents.;
wherein the copolyester contains substantially equal molar proportions of acid equivalents (100 mole %) and diol equivalents (100 mole %), and wherein the inherent viscosity of said copolyester is at least about 0.1 dL/g measured in a 60/40 parts by weight solution of phenol/tetrachloroethane solvent at 25° C. and at a concentration of about 0.25 g of copolyester in 100 mL of solvent, and wherein the copolyester has a melt temperature ($T_m$) of at least about 75° C. and a glass transition temperature ($T_g$) of less than about 125° C.

2. The copolyester of claim 1, wherein the 4,4'-biphenyl dicarboxylic acid (a) is present in an amount of from about 30 to 100 mol % based on the total acid equivalents.

3. The copolyester of claim 1, wherein the difunctional dicarboxylic acid comonomer (b) is present in an amount of from up to about 25 mol % based on the total acid equivalents and is selected from the group consisting of succinic, glutaric, adipic, azelaic, sebacic, fumaric, maleic, itaconic, 1,3-cyclohexane dicarboxylic, 1,4-cyclohexane dicarboxylic, diglycolic, 2,5-norbonanedicarboxylic, phthalic, terephthalic, 1,4-naphthalenedicarboxylic, 2,5-naphthalenedicarboxylic, 2,6-naphthalenedicarboxylic, 2,7-naphthalenedicarboxylic, diphenic, 4,4'-oxydibenzoic, 4,4'-sulfonyldibenzoic, isophthalic acid, and mixtures thereof.

4. The copolyester of claim 1, wherein the cation of the sulfonate group is a metal cation.

5. The copolyester of claim 1, wherein said sulfomonomer (c) is present in an amount of from about 10 to about 30 mol % based on the total acid equivalents and is a sulfophthalic acid, a sulfoisopthalic acid, a sulfoterephthalic acid, a 4-sulfonapthalene-2,7-dicarboxylic acid or esters thereof.

6. The copolyester of claim 1, wherein the difunctional monomer is 5-sodioisophthalic acid.

7. The copolyester of claim 1, wherein the poly(ethylene) glycol is a diethylene glycol, a triethylene glycol, a tetraethylene glycol, or a mixture thereof.

8. The copolyester of claim 1, wherein the acid (b) and any diol component (e) other than poly(ethylene) glycol are together present in less than about 40 mol % based on the total acid and hydroxyl equivalents.

9. The copolyester of claim 1, wherein the inherent viscosity ranges from about 0.2 to about 0.8 dL/g.

10. The copolyester of claim 1, wherein the $T_g$ ranges from about 30° to 60° C. and the $T_m$ ranges from about 80° to 185° C.

11. The copolyester of claim 10, wherein the $T_g$ is less than about 50° C.

12. An aqueous dispersion comprising at least 10% (w/w) of an essentially linear water-dispersible copolyester composition comprising residues of:

(a) 4,4'diphenyl dicarboxylic acid, optionally substituted by 1–4 methyl groups;

(b) optionally, at least one difunctional dicarboxylic acid which is other than a sulfomonomer;

(c) an amount of at least one difunctional sulfomonomer containing at least one metal sulfonate group bonded to an aromatic ring, wherein the functional group is selected from esters, hydroxyl, or carboxyl;

(d) optionally, at least one hydroxycarboxylic acid; and (e) a diol or mixture of diols, wherein the diol(s) comprises a poly(ethylene) glycol present in an amount of at least about 60 mol % based on the total hydroxyl equivalents.;

wherein the copolyester contains substantially equal molar proportions of acid equivalents (100 mole %) and diol equivalents (100 mole %), and wherein the inherent viscosity of said copolyester is at least about 0.1 dL/g measured in a 60/40 parts by weight solution of phenol/tetrachloroethane solvent at 25° C. and at a concentration of about 0.25 g of copolyester in 100 mL of solvent, and wherein the copolyester has a melt temperature ($T_m$) of at least about 75° C. and a glass transition temperature ($T_g$) of less than about 125° C.

13. An essentially linear water-dispersible copolyester composition comprising residues of:

(a) 4,4'diphenyl dicarboxylic acid;

(b) from 0 to about 25 mol %, based on the total acid equivalents, of at least one difunctional dicarboxylic acid which is other than a sulfomonomer or a 4,4'diphenyl dicarboxylic acid;

(c) from about 10 to about 30 mol %, based on the total acid equivalents, of at least one difunctional sulfomonomer containing one metal sulfonate group bonded to an aromatic ring substituted with ester, hydroxyl, or carboxylic acid functional groups;

(d) greater than about 60 mol %, based on the total hydroxyl equivalents, of diethylene or triethylene glycol; and (e) optionally, less than 40 mol %, based on the total hydroxyl equivalents, of a glycol without internal ether moieties, wherein the polyester contains substantially equal molar proportions of acid equivalents (100 mol %) and glycol equivalents (100 mol %), wherein the inherent viscosity of said copolyester is at least about 0.1 dL/g measured in a 60/40 parts by weight solution of phenol/tetra-chloroethane solvent at 25° C. and at a concentration of about 0.25 g of polymer in 100 mL of solvent, and wherein the polymer has a melt temperature ($T_m$) of about 80° C. to 185° and a glass transition temperature ($T_g$) of about 30° to 60° C.

14. The copolyester of claim 13, wherein the total of (b) and (e) is less than 40 mol % based on a 200 mol % total.

* * * * *